United States Patent
Cao et al.

(10) Patent No.: US 11,711,427 B2
(45) Date of Patent: Jul. 25, 2023

(54) DATA ACQUISITION SYSTEM AND METHOD

(71) Applicant: Siemens Aktiengesellschaft, Munich (DE)

(72) Inventors: Wen Bin Cao, Beijing (CN); Zhu Niu, Beijing (CN); Shun Jie Fan, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/432,964

(22) PCT Filed: Apr. 26, 2019

(86) PCT No.: PCT/CN2019/084671
§ 371 (c)(1),
(2) Date: Aug. 23, 2021

(87) PCT Pub. No.: WO2020/215337
PCT Pub. Date: Oct. 29, 2020

(65) Prior Publication Data
US 2022/0091588 A1 Mar. 24, 2022

(51) Int. Cl.
*H04L 67/12* (2022.01)
*G05B 19/418* (2006.01)

(52) U.S. Cl.
CPC .......... *H04L 67/12* (2013.01); *G05B 19/4185* (2013.01)

(58) Field of Classification Search
CPC .. H04L 67/12; G05B 19/4185; G05B 19/0423
See application file for complete search history.

(56) References Cited

U.S. PATENT DOCUMENTS 8,565,109 B1 * 10/2013 Poovendran ...... H04W 52/0216
370/231
8,712,707 B2 * 4/2014 Murakami ............. G06Q 50/06
709/224

(Continued)

FOREIGN PATENT DOCUMENTS

CN 104768171 A * 7/2015
CN 104768171 A 7/2015

(Continued)

OTHER PUBLICATIONS

International Search Report and Written Opinion with English translation thereof dated Jan. 14, 2020.

(Continued)

*Primary Examiner* — Eyob Hagos
(74) *Attorney, Agent, or Firm* — Harness, Dickey & Pierce, P.L.C.

(57) ABSTRACT

Provided are a data acquisition system and method. The system includes: data acquisition units, to acquire a plurality of pieces of data related to a target object within a data acquisition period; and a controller, communicatively connected to the data acquisition units, to set, according to an ith data acquisition period, a sampling interval time of the ith piece of data, and to set a polling interval time according to a minimum data acquisition period of the data acquisition units. Upon the controller starting to perform polling on the data acquisition units through n_1 polling interval times until a condition is satisfied for the first time, the controller performs first polling, for the ith piece of data, on a data acquisition unit of the data acquisition units for acquiring the ith piece of data.

25 Claims, 2 Drawing Sheets

(56) References Cited

U.S. PATENT DOCUMENTS

| | | | |
|---|---|---|---|
| 9,058,422 B2 * | 6/2015 | Han | G06F 13/34 |
| 2007/0242688 A1 * | 10/2007 | McFarland | H04L 12/2803 |
| | | | 455/73 |
| 2010/0041349 A1 * | 2/2010 | Mahany | H04W 74/06 |
| | | | 455/88 |
| 2016/0029964 A1 * | 2/2016 | LeBoeuf | A61B 5/68 |
| | | | 600/476 |
| 2017/0041897 A1 * | 2/2017 | Pitigoi-Aron | H04J 3/0685 |
| 2018/0143217 A1 * | 5/2018 | Liou | G01P 15/0802 |
| 2018/0299853 A1 | 10/2018 | Wang et al. | |
| 2019/0020433 A1 * | 1/2019 | Pitigoi-Aron | H04W 56/001 |

FOREIGN PATENT DOCUMENTS

| | | | | |
|---|---|---|---|---|
| CN | 106851802 A | * | 6/2017 | H04W 52/0287 |
| CN | 106851802 A | | 6/2017 | |
| GB | 2601252 A | * | 5/2022 | G06F 16/3344 |

OTHER PUBLICATIONS

International Search Report and Written Opinion dated Jan. 14, 2020.

* cited by examiner

DATA ACQUISITION SYSTEM AND METHOD

PRIORITY STATEMENT

This application is the national phase under 35 U.S.C. § 371 of PCT International Application No. PCT/CN2019/084671 which has an International filing date of Apr. 26, 2019, the entire contents of which are hereby incorporated herein by reference.

FIELD

Embodiments of the present application generally relate to a data acquisition system and method.

BACKGROUND

In applications such as industrial automation and the IOT (Internet of Things), devices for real-time serial communication (RS232, RS485, etc.) are widely used, for example, Simatic OT2000, Sinamics Connect, Simatic PLC of Siemens and other products. Compared with conventional industrial PCs, these devices have certain processing capabilities and can perform real-time serial communication with a plurality of external devices with different sampling periods.

SUMMARY

Embodiments of the present invention aims to improve upon or even solve the above and/or other technical problems and to provide a data acquisition system and method.

According to an example embodiment, the data acquisition or collection system comprises: data acquisition units, constructed to acquire a plurality of data related to a target object in a preset data acquisition period; a controller, which is in communication connection with the data acquisition units and is constructed to set the sampling interval of the ith datum according to the data acquisition period of the ith datum used by the data acquisition units to acquire the ith datum among the plurality of data, and to set the polling interval according to the smallest data acquisition period of the data acquisition periods used by the data acquisition units to acquire each of the plurality of data, wherein, when n_1 polling intervals have elapsed since the controller starts polling the data acquisition units, on the plurality of data, until the following formula (3) is satisfied for the first time, the controller performs the first polling, on the ith datum, of the data acquisition unit among the data acquisition units that is used to acquire the ith datum, $$T\_i1 = CP \times n\_1 \geq SP\_i, \qquad (3)$$

and in formula (3), T_i1 is the time elapsed since the start of polling, CP is the polling interval, SP_i is the sampling period of the ith datum, and n_1 is an integer.

According to yet another example embodiment, a data acquisition method is provided, comprising: setting the sampling interval of the ith datum according to the data acquisition period of the ith datum used by the data acquisition units to acquire the ith datum among the plurality of data, and setting the polling interval according to the smallest data acquisition period of the data acquisition periods used by the data acquisition units to acquire each of the plurality of data; when n_1 polling intervals have elapsed since the start of polling until the following formula (3) is satisfied for the first time, performing the first polling on the ith datum, $$T\_i1 = CP \times n\_1 \geq SP\_i, \qquad (3)$$

and in formula (3), T_i1 is the time elapsed since the start of polling, CP is the polling interval, SP_i is the sampling period of the ith datum, and n_1 is an integer.

According to other example embodiments, an electronic device is provided, comprising: at least one processor; a memory connected to the at least one processor, wherein the memory has an instruction stored in it, which, when executed by the at least one processor, causes the electronic device to perform actions of an embodiment of the method.

According to other example embodiments, a non-transient machine-readable medium is provided, which stores instructions that can be executed by a computer, which, when executed, cause at least one processor to perform an embodiment of the method.

According to other example embodiments, a computer program product is provided, characterized in that the computer program product comprises instructions that can be executed by a computer, which, when executed, cause at least one processor to perform an embodiment of the method.

BRIEF DESCRIPTION OF THE DRAWINGS

The following drawings are only intended to illustrate and explain the embodiments of the present invention schematically, and do not limit the scope of the embodiments of the present invention. In the drawings.

REFERENCE NUMERALS IN THE DRAWINGS

Figure 1:
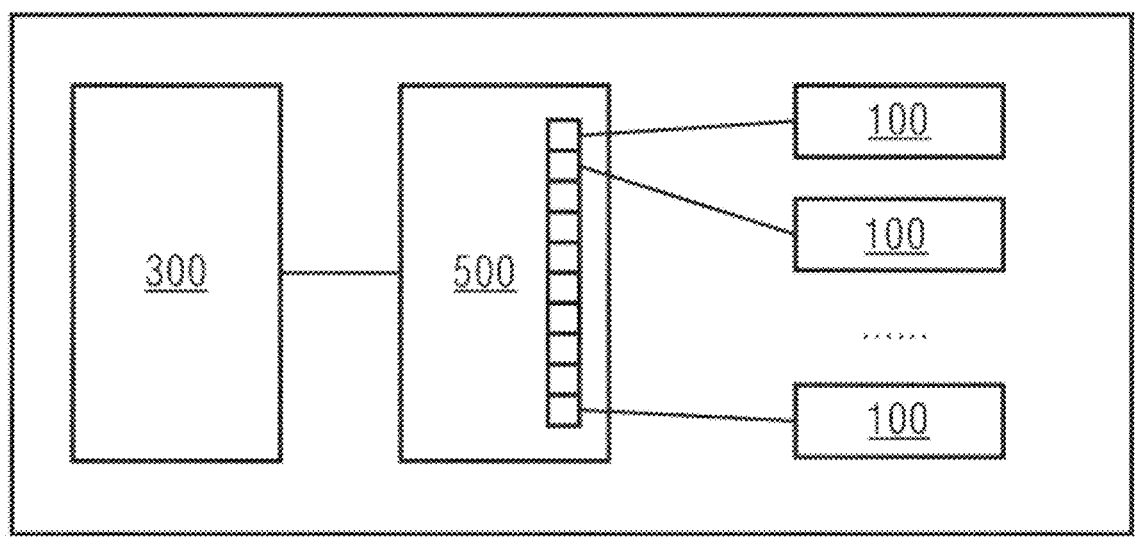
FIG. 1 is a schematic block diagram of the data acquisition system according to an example embodiment.

100 Data acquisition unit; 300 Controller; 500 connection unit
1010 Processor; 1030 Memory

DETAILED DESCRIPTION OF THE EXAMPLE EMBODIMENTS

According to an example embodiment, the data acquisition or collection system comprises: data acquisition units, constructed to acquire a plurality of data related to a target object in a preset data acquisition period; a controller, which is in communication connection with the data acquisition units and is constructed to set the sampling interval of the ith datum according to the data acquisition period of the ith datum used by the data acquisition units to acquire the ith datum among the plurality of data, and to set the polling interval according to the smallest data acquisition period of the data acquisition periods used by the data acquisition units to acquire each of the plurality of data, wherein, when n_1 polling intervals have elapsed since the controller starts polling the data acquisition units, on the plurality of data, until the following formula (3) is satisfied for the first time, the controller performs the first polling, on the ith datum, of the data acquisition unit among the data acquisition units that is used to acquire the ith datum, $$T\_i1 = CP \times n\_1 \geq SP\_i, \qquad (3)$$

and in formula (3), T_i1 is the time elapsed since the start of polling, CP is the polling interval, SP_i is the sampling period of the ith datum, and n_1 is an integer.

In addition, when n_j polling intervals have elapsed since the start of polling until the following formula (4) is satisfied for the first time, the controller performs the jth polling, on the ith datum, of the data acquisition unit among the data acquisition units that is used to acquire the ith datum, $$T\_ij = CP \times n\_j \geq SP\_i + C\_i \times (j-1), \qquad (4)$$

and in formula (4), T_ij is the time elapsed since the start of polling, CP is the polling interval, SP_i is the sampling period of the ith datum, C_i is the ith datum acquisition period of the ith datum, n_j is an integer, and j is an integer and j≥2.

The data acquisition system according to the example embodiment features a unified polling interval, so that the real-time performance of data acquisition can be improved, and the load balance in communication used to receive the acquired data can be improved.

The controller sets the sampling period SP_i of the ith datum according to the following formula (1), $$SP\_i = C\_i + C\_i \times (i/M), \qquad (1)$$

and in formula (1), C_i is the ith datum acquisition period of the ith datum, the plurality of data comprise N data groups, each of the N data groups comprises M data, and i is the ordinal number of the ith datum in the corresponding group of the N data groups, and 0≤i≤M−1. In this way, the sampling period can be set for each datum according to the data acquisition period of the datum, so that the load balance in the communication used to receive the acquired data can be improved.

The controller sets the polling interval CP according to the following formula (2), $$CP = (C\_Min \times 10^{len[M \times N]-1})/(M \times N), \qquad (2)$$

and in formula (2), C_Min is the smallest data acquisition period among the data acquisition periods of the plurality of data, the plurality of data comprise N data groups, each of the N data groups comprises M data, and len[M×N] is the number of digits of the result of M×N. In this way, the polling interval can be set according to the smallest data acquisition period, so as to ensure that data have been acquired when polling is performed at the polling interval set in this way, thus preventing polling when data are not acquired.

The target object is a driver used to drive a robot device, and the data acquisition units comprise sensor units that acquire data related to the driver. Alternatively, the target object may be a sensed object of a sensor unit in the Internet of Things (IOT), and the data acquisition units may comprise sensor units for acquiring data related to such objects.

The data acquisition or collection system and method according to the example embodiment may be applied to any collection environment. For example, in a plant automation scenario, the IOT technology is used to collect equipment parameters in real time, helping clouds such as Siemens Mindsphere perform linear processing to collect data. Here, as different data collection periods (data acquisition periods) may be used, if data are collected directly, the data received on the cloud side may be a plurality of data mixed together, which may negatively affect data computation by algorithms. For example, in a DCS (distributed control system), data sensed by sensors can be acquired in real time, thereby reducing the pressure on distributed controllers.

In an embodiment, the data acquisition system further comprises: a connection unit, connected between the controller and the data acquisition units for the controller and the data acquisition units to communicate with each other, wherein the connection unit receives the ith datum from the data acquisition units and sends the ith datum to the controller.

Therefore, it is possible to eliminate the sub-controllers usually provided between the controller (main controller) and the data acquisition units, and only to provide a connection unit as an interface for communication between the controller and the data acquisition units, and for example, the connection unit may be implemented in the form of an expansion card. In addition, the connection unit comprises: a buffer unit, constructed to buffer the received ith datum.

According to another example embodiment, a data acquisition method is provided, comprising: acquiring a plurality of data related to a target object in a preset data acquisition period; setting the sampling interval of the ith datum according to the data acquisition period of the ith datum used by the data acquisition units to acquire the ith datum among the plurality of data, and setting the polling interval according to the smallest data acquisition period of the data acquisition periods used by the data acquisition units to acquire each of the plurality of data; when n_1 polling intervals have elapsed since the start of polling, on the plurality of data, until the following formula (3) is satisfied for the first time, performing the first polling on the ith datum, wherein T_i1=CP×n_1≥SP_i . . . (3), and in formula (3), T_i1 is the time elapsed since the start of polling, CP is the polling interval, SP_i is the sampling period of the ith datum, and n_1 is an integer; receiving the ith datum.

The sampling period SP_i of the ith datum is set according to the following formula (1), $$SP\_i = C\_i + C\_i \times (i/M), \qquad (1)$$

and in formula (1), C_i is the ith datum acquisition period of the ith datum, the plurality of data comprise N data groups, each of the N data groups comprises M data, and i is the ordinal number of the ith datum in the corresponding group of the N data groups, and 0≤i≤M−1.

The polling interval CP is set according to the following formula (2), $$CP = (C\_Min \times 10^{len[M \times N]-1})/(M \times N), \qquad (2)$$

and in formula (2), C_Min is the smallest data acquisition period among the data acquisition periods of the plurality of data, the plurality of data comprise N data groups, each of the N data groups comprises M data, and len[M×N] is the number of digits of the result of M×N.

When n_j polling intervals have elapsed since the start of polling until the following formula (4) is satisfied for the first time, the jth polling on the ith datum is performed, $$T\_ij = CP \times n\_j \geq SP\_i + C\_i \times (j-1), \quad (4)$$

and in formula (4), T_ij is the time elapsed since the start of polling, CP is the polling interval, SP_i is the sampling period of the ith datum, C_i is the ith datum acquisition period of the ith datum, n_j is an integer, and j is an integer and j≥2.

According to yet another example embodiment, a data acquisition method is provided, comprising: setting the sampling interval of the ith datum according to the data acquisition period of the ith datum used by the data acquisition units to acquire the ith datum among the plurality of data, and setting the polling interval according to the smallest data acquisition period of the data acquisition periods used by the data acquisition units to acquire each of the plurality of data; when n_1 polling intervals have elapsed since the start of polling until the following formula (3) is satisfied for the first time, performing the first polling on the ith datum, $$T\_i1 = CP \times n\_1 \geq SP\_i, \quad (3)$$

and in formula (3), T_i1 is the time elapsed since the start of polling, CP is the polling interval, SP_i is the sampling period of the ith datum, and n_1 is an integer.

The sampling period SP_i of the ith datum is set according to the following formula (1), $$SP\_i = C\_i + C\_i \times (i/M), \quad (1)$$

and in formula (1), C_i is the ith datum acquisition period of the ith datum, the plurality of data comprise N data groups, each of the N data groups comprises M data, and i is the ordinal number of the ith datum in the corresponding group of the N data groups, and 0≤i≤M−1.

The polling interval CP is set according to the following formula (2), $$CP = (C\_Min \times 10^{len[M \times N]-1})/(M \times N), \quad (2)$$

and in formula (2), C_Min is the smallest data acquisition period among the data acquisition periods of the plurality of data, the plurality of data comprise N data groups, each of the N data groups comprises M data, and len[M×N] is the number of digits of the result of M×N.

When n_j polling intervals have elapsed since the start of polling until the following formula (4) is satisfied for the first time, the jth polling on the ith datum is performed, $$T\_ij = CP \times n\_j \geq SP\_i + C\_i \times (j-1), \quad (4)$$

and in formula (4), T_ij is the time elapsed since the start of polling, CP is the polling interval, SP_i is the sampling period of the ith datum, C_i is the ith datum acquisition period of the ith datum, n_j is an integer, and j is an integer and j≥2.

According to other example embodiments, an electronic device is provided, comprising: at least one processor; a memory connected to the at least one processor, wherein the memory has an instruction stored in it, which, when executed by the at least one processor, causes the electronic device to perform actions of an embodiment of the method.

According to other example embodiments, a non-transient machine-readable medium is provided, which stores instructions that can be executed by a computer, which, when executed, cause at least one processor to perform an embodiment of the method.

According to other example embodiments, a computer program product is provided, characterized in that the computer program product comprises instructions that can be executed by a computer, which, when executed, cause at least one processor to perform an embodiment of the method.

In order to have a clearer understanding of the technical features, purpose and effects of the present invention, the specific embodiments of the present invention will be described below by referring to the drawings.

FIG. 1 is a schematic block diagram of the data acquisition system according to an example embodiment. As shown in FIG. 1, the data acquisition system according to an example embodiment may comprise data acquisition units 100 and a controller 300.

The data acquisition units 100 can acquire a plurality of data related to a target object at a preset or specific data acquisition period. Here, when the target object is, for example, a driver of a robot device, the data acquisition units may be a variety of sensors that sense the operating status of the driver of the robot device, so as to collect various data related to the driver of the robot device, for example, operating data. Here, one data acquisition unit can acquire (for example, sample or sense) one or more types of data in the same or different data acquisition periods. Alternatively, a plurality of data acquisition units can acquire (for example, sample or sense) one or more types of data in the same or different data acquisition periods. The data acquisition period refers to the time interval for the data acquisition units to acquire the same type of data for multiple times. In one example, a plurality of data acquisition units can acquire data for a plurality of different target objects. Therefore, the data acquisition units can be grouped based on the target objects. There may be N data acquisition unit groups to acquire data for N target objects respectively, so that N data groups respectively related to the N target objects can be obtained. Each of the N data acquisition unit groups may comprise data acquisition units of the same number or different numbers. Accordingly, each of the N data groups acquired by the N data acquisition unit groups may comprise data of the same number or different numbers. In addition, the data comprised in a data group may be sorted, for example, arbitrarily. In one example, each data group may comprise M data, and the M data may be sorted into the 0th datum, 1st datum, . . . , and (M−1)th datum.

In an example embodiment, the data acquisition units 100 can acquire a large number of data related to target objects at a preset scanning cycle. A large number of parameters (temperature, pressure) related to the target objects can be inquired by, for example, the controller 300, and the periods of the response data of the inquired parameters may be non-linear, i.e., the responses may be made not at the same time. For example, the inquiry responding period for the temperature parameter of target A may be 1 s, that for the voltage parameter of target A may be 3 s, and that of the voltage parameter of target B may be 2 s. The data acquisition units 100 according to an example embodiment can inquire these parameters at a preset scanning cycle (i.e., data acquisition period), so as to obtain the response data of each parameter of targets A and B in real time, without interference and data loss.

The controller 300 can be in communication connection with the data acquisition units 100. For this, the data acquisition system as shown in FIG. 1 may comprise a connection unit 500. The connection unit 500 may be connected between the controller 300 and the data acquisition units 100 to allow the controller and the data acquisition units to communicate with each other. For example, the controller 300 may poll the data acquisition units 100 via the connection unit 500 to receive the data acquired by the data acquisition units 100 from the data acquisition units 100.

According to an example embodiment, in order to poll the data acquisition units 100 on a certain datum after it is acquired by the data acquisition units 100 in a timely manner, and to ensure that the data acquisition unit 100 for acquiring a certain datum has acquired the datum when the data acquisition unit 100 is polled on the datum, the controller 300 may set the sampling interval of the datum according to the data acquisition period used by the data acquisition unit 100 to acquire a certain datum, and may set the polling interval according to the smallest data acquisition period of the data acquisition periods used by the data acquisition units 100 to acquire each one of all the data.

Specifically, the controller 300 sets the sampling period $SP\_i$ of the ith datum of the plurality of data according to the following formula (1), $$SP\_i = C\_i + C\_i \times (i/M), \quad \text{formula (1)}$$

and in formula (1), $C\_i$ is the ith datum acquisition period of the ith datum, the plurality of data may comprise N data groups, each of the N data groups may comprise M data, and i may be the ordinal number of the ith datum in the corresponding group of the N data groups, and Table 1 below shows the M data comprised in one of the N data groups and the sampling intervals obtained according to the above formula (1). In this example, N=24, and M=10.

TABLE 1

| Data name | No. i | Period $C\_i$ (s) | Sampling interval $SP\_j$ (s) |
|---|---|---|---|
| $m_1$ | i = 0 | $C\_0 = 1$ | $SP\_0 = 1 + 1 \times (0/10) = 1$ |
| $m_2$ | i = 1 | $C\_1 = 2$ | $SP\_1 = 2 + 2 \times (1/10) = 2.2$ |
| ... | ... | ... | ... |
| $M_{10}$ | i = 9 | $C\_9 = 5$ | $Sp\_9 = 5 + 5 \times (9/10) = 9.5$ |

In addition, the controller 300 may set the polling interval CP according to the following formula (2), $$CP = (C\_Min \times 10^{len[M \times N]-1})/(M \times N), \quad (2)$$

and in formula (2), C_Min is the smallest data acquisition period among the data acquisition periods of the plurality of data, the plurality of data comprise N data groups, each of the N data groups comprises M data, and len[M×N] is the number of digits of the result of M×N.

In the example embodiment above, the plurality of data acquisition units can acquire 24 data groups, i.e., N=24, each data group can comprise 10 data, i.e., M=10, and at the same time, the smallest data acquisition period C_Min of the data acquisition periods used to acquire these data is 1 s. Therefore, according to formula (2), the polling interval CP=1× $10^{3-1}/(10\times24)\approx4.4167$ s. Here, for ease of description, the obtained polling interval CP is taken as approximately 0.4 s, but those skilled in the art can understand that the polling interval may be equal to or greater than the CP obtained according to formula (2).

In particular, in formula (2), $10^{len[M \times N]-1}$ is a coefficient used to prevent CP from being too small, and is optional and/or replaceable. For example, in the above example, $10^{len[M \times N]-1}$ may not be included in formula (2), and the polling interval CP will be calculated to be approximately 4 ms. In addition, formula (2) may be modified in other ways to prevent the value of CP from being too small, but it should be ensured that CP is less than C_Min.

After determining the sampling interval and the polling interval of each datum, the controller 300 may poll the data acquisition units 100 on each datum based on the calculation results. For example, when n_1 polling intervals have elapsed since the controller 300 starts polling the data acquisition units 100 until the following formula (3) is satisfied for the first time, the controller 300 may perform the first polling, on the ith datum, of the data acquisition unit among the data acquisition units 100 that is used to acquire the ith datum, $$T\_i1 = CP \times n\_1 \geq SP\_i, \quad (3)$$

and in formula (3), $T\_i1$ is the time elapsed since the controller 300 starts polling, CP is the polling interval, $SP\_i$ is the sampling period of the ith datum, and n_1 is an integer.

For example, in the example embodiment above, the polling interval CP may be approximately 0.4 s, the sampling interval $SP\_0$ for datum $m_1$ may be 1 s, and, when n_1 is 3, i.e., when 3 polling intervals have elapsed, the formula (3) is satisfied for the first time, i.e., $T\_01=0.4\times3=1.2\geq1$. At this point, the controller 300 may poll the data acquisition unit 100 for acquiring datum $m_1$ for the first time. At this point, as 1.2 s has elapsed since the polling starts, the data acquisition unit 100 has acquired datum $m_1$ at a data acquisition period of 1 s. In this way, it can be ensured that the data acquisition unit polled when the controller 300 performs the first polling on a certain datum has acquired the datum.

However, example embodiments are not limited thereto. In other example embodiments, the controller 300 can ensure that the data acquisition unit has acquired the datum every time it polls on a certain datum. For example, when n_j polling intervals have elapsed since the controller 300 starts polling until the following formula (4) is satisfied for the first time, the controller performs the jth polling, on the ith datum, of the data acquisition unit among the data acquisition units that is used to acquire the ith datum, $$T\_ij = CP \times n\_j \geq SP\_i + C\_i \times (j-1), \quad (4)$$

and in formula (4), T_ij is the time elapsed since the start of polling, CP is the polling interval, SP_i is the sampling period of the ith datum, C_i is the ith datum acquisition period of the ith datum, n_j is an integer, and j is an integer and j≥2.

For example, in the example embodiment above, the polling interval CP may be approximately 0.4 s, the sampling interval SP_0 for datum $m_1$ may be 1 s, and the sampling interval SP_1 for datum $m_2$ may be 2.2 s. Then the controller 300 can poll the data acquisition units for acquiring data $m_1$ and $m_2$ according to formula (3) or formula (4), as shown in Table 2 below.

TABLE 2

| Time elapsed since start of polling (CP×n_j) | Datum $m_1$ (SP_0 = 1) The jth polling of the data acquisition unit for acquiring datum $m_1$? | | Datum $m_2$ (SP_1 = 2.2) The jth polling of the data acquisition unit for acquiring datum $m_2$? | |
|---|---|---|---|---|
| 0.4 × 1 = 0.4 | No | j = 1; 0.4 < 1 + 1 × (1-1) | No | j = 1; 0.4 < 2.2 + 1 × (1-1) |
| 0.4 × 2 = 0.8 | No | j = 1; 0.8 < 1 + 1 × (1-1) | No | j = 1; 0.8 < 2.2 + 1 × (1-1) |
| 0.4 × 3 = 1.2 | Yes, perform the first polling. | j = 1; 1.2 ≥ 1 + 1 × (1-1) | No | j = 1; 1.2 < 2.2 + 1 × (1-1) |
| 0.4 × 4 = 1.6 | No | j = 2; 1.6 < 1 + 1 × (2-1) | No | j = 1; 1.6 < 2.2 + 1 × (1-1) |
| 0.4 × 5 = 2.0 | Yes, perform the second polling. | j = 2; 2.0 ≥ 1 + 1 × (2-1) | No | j = 1; 2.0 < 2.2 + 1 × (1-1) |
| 0.4 × 6 = 2.4 | No | j = 3; 2.4 < 1 + 1 × (3-1) | Yes, perform the first polling. | j = 1; 2.4 ≥ 2.2 + 1 × (1-1) |
| 0.4 × 7 = 2.8 | No | j = 3; 2.8 < 1 + 1 × (3-1) | No | j = 2; 2.8 < 2.2 + 1 × (2-1) |

In the example shown in Table 2, according to formula (3) or formula (4), the controller 300 can perform the first polling, on datum $m_1$, of the data acquisition unit for acquiring this datum when 3 polling intervals have elapsed since the start of polling, and can perform the second polling, on datum $m_1$, of the data acquisition unit for acquiring this datum when 5 polling intervals have passed since the start of polling. At the same time, the controller 300 can perform the first polling, on datum $m_2$, of the data acquisition unit for acquiring this datum when 6 polling intervals have elapsed since the start of polling. In this way, it can be ensured that the data acquisition units have acquired the data when the controller 300 performs each polling.

Referring to FIG. 1, when the controller 300 polls the data acquisition unit 100 on a certain datum at a period determined according to formula (3) or formula (4), the controller 300 may send a polling instruction for the datum to the connection unit 500. The connection unit 500 may send the received polling instruction to the data acquisition unit for acquiring the datum. For example, the connection unit 500 may have a plurality of communication ports, and these communication ports may be communicatively connected to the data acquisition units, so as to send polling instructions to the data acquisition units 100 through these ports. When the data acquisition unit 100 receives a polling instruction, it may send the acquired datum to the connection unit 500 through the communication port. Then, the connection unit 500 may send the datum from the data acquisition unit 100 to the controller 300. In addition, the connection unit 500 may further comprise a buffer unit (not shown). The buffer unit can buffer, for example, temporarily store data from the data acquisition units.

The data acquisition method according to an example embodiment will be described below by referring to FIG. 2. Since the data acquisition method according to the example embodiment can be executed by the data acquisition system according to the example embodiment described above, the same or similar features will not be described again below.

Figure 2:
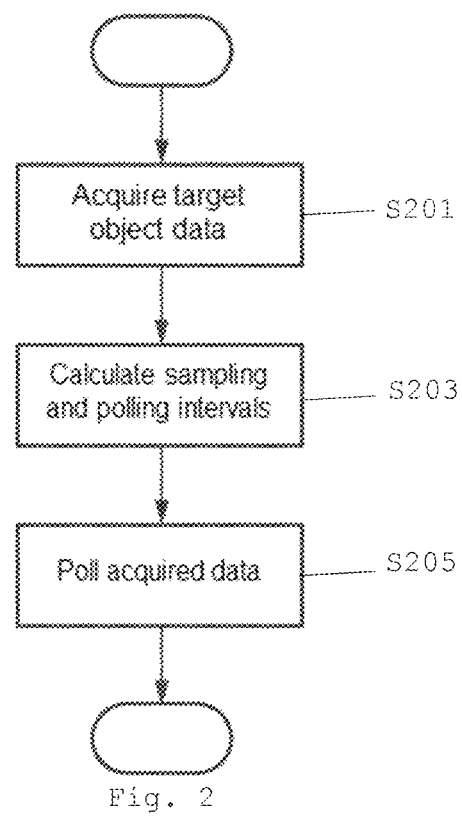
FIG. 2 is a schematic flow chart of the data acquisition method according to an example embodiment.

As shown in FIG. 2, firstly, in step S201, a plurality of data related to a target object can be acquired at a preset or specific data acquisition period. Here, when the target object is, for example, a driver of a robot device, various data related to the driver of the robot device, for example, operating data, may be collected through a variety of sensors that sense the operating status of the driver of the robot device. The data acquisition period refers to the time interval to acquire the same type of data for multiple times. In one example, data for a plurality of different target objects may be acquired. Hence, the acquired data may be grouped based on the target objects. For example, if data are acquired for N target objects, N data groups respectively related to the N target objects can be obtained. Each of the N data acquisition unit groups may comprise data acquisition units of the same number or different numbers. Accordingly, each of the N data groups acquired by the N data acquisition unit groups may comprise data of the same number or different numbers. In addition, the data comprised in a data group may be sorted, for example, arbitrarily. In one example, each data group may comprise M data, and the M data may be sorted into the 1th datum, 2st datum, . . . , (M−1)th datum, and Mth datum.

Then, referring to FIG. 2, the acquired data can be polled in steps S203 and S205. Here, steps S203 and S205 may be comprised in the data polling method according to the example embodiment. For example, in step S203, the sampling interval of a certain datum may be set according to the data acquisition period for acquiring the datum, and the polling interval may be set according to the smallest data acquisition period of the data acquisition periods for acquiring each one of all the data.

Specifically, the sampling period SP_i of the ith datum of the plurality of data may be set according to the following formula (1), $$SP\_i = C\_i + C\_i \times (i/M), \quad (1)$$

and in formula (1), C_i is the ith datum acquisition period of the ith datum, the plurality of data may comprise N data groups, each of the N data groups may comprise M data, and i may be the ordinal number of the ith datum in the corresponding group of the N data groups, and 0≤i≤M−1.

In addition, the polling interval CP may be set according to the following formula (2), $$CP = (C\_Min \times 10^{len[M \times N]-1})/(M \times N), \quad (2)$$

and in formula (2), C_Min is the smallest data acquisition period among the data acquisition periods of the plurality of data, the plurality of data comprise N data groups, each of the N data groups comprises M data, and len[M×N] is the number of digits of the result of M×N.

Then, after determining the sampling interval and the polling interval of each datum in step S205, the data acquisition units 100 may be polled on each datum based on the calculation results. For example, when n_1 polling intervals have elapsed since the start of polling of the data acquisition units 100 until the following formula (3) is satisfied for the first time, the first polling, on the ith datum, of the data acquisition unit among the data acquisition units 100 that is used to acquire the ith datum may be performed, $$T\_i1 = CP \times n\_1 \geq SP\_i, \quad (3)$$

and in formula (3), T_i1 is the time elapsed since the controller 300 starts polling, CP is the polling interval, SP_i is the sampling period of the ith datum, and n_1 is an integer.

However, example embodiments are not limited thereto. In other example embodiments, it can be ensured that the data acquisition unit has acquired the datum every time it polls on a certain datum. For example, when n_j polling intervals have elapsed since the start of polling until the following formula (4) is satisfied for the first time, the controller performs the jth polling, on the ith datum, of the data acquisition unit among the data acquisition units that is used to acquire the ith datum, $$T\_ij = CP \times n\_j \geq SP\_i + C\_i \times (j-1), \quad (4)$$

and in formula (4), T_ij is the time elapsed since the start of polling, CP is the polling interval, SP_i is the sampling period of the ith datum, C_i is the ith datum acquisition period of the ith datum, n_j is an integer, and j is an integer and j≥2.

When polling on a certain datum is performed at a period determined according to formula (3) or formula (4), a polling instruction for the datum may be sent to the data acquisition unit for acquiring the datum. The data acquisition unit may send the acquired datum when receiving a polling instruction. In this way, the data acquisition method according to the example embodiment may further comprise step S207, receiving the data from the data acquisition units.

Figure 3:
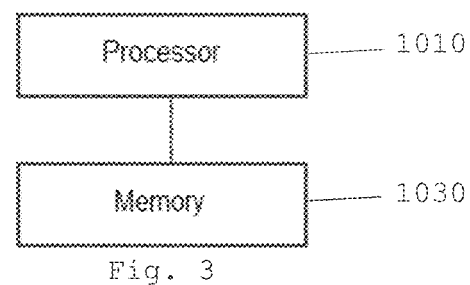
FIG. 3 is a schematic block diagram of the electronic device according to an example embodiment.

The data acquisition and control method according to example embodiments described above by referring to FIG. 1 and FIG. 2 may be implemented by hardware, software, or a combination of hardware and software. FIG. 3 is a block diagram of the electronic device according to an example embodiment. In the present example embodiment, the electronic device 1000 may comprise at least one processor 1010 and a memory 1030. The processor 1010 can execute at least one computer-readable instruction (i.e., an element implemented in the form of software as described above) stored or encoded in a computer-readable storage medium (i.e., the memory 1030).

In one embodiment, computer-executable instructions are stored in the memory 1030, which, when executed, cause the at least one processor 1010 to implement or execute the data acquisition method or data polling method described above by referring to FIG. 2.

It should be understood that the computer-executable instructions stored in the memory 1030, when executed, cause the at least one processor 1010 to perform the various operations and functions in each embodiment described above by referring to FIG. 1 and FIG. 2.

According to one embodiment, a program product such as a non-transient machine-readable medium is provided. The non-transient machine-readable medium may have instructions (i.e., elements implemented in the form of software as described above) that, when executed by a machine, cause the machine to execute the various operations and functions in the embodiments of the present application described above by referring to FIG. 1 and FIG. 2.

According to one embodiment, a computer program product is provided, comprising computer-executable instructions, which, when executed, cause at least one processor to perform the various operations and functions described above in the embodiments of the present application by referring to FIG. 1 and FIG. 2.

It should be understood that, although this description is given to the various embodiments, not each embodiment contains only one independent technical solution. This way of description is only for clarity, and those skilled in the art should regard the description as a whole. The technical solutions in each embodiment can also be appropriately combined to form other implementations that can be understood by those skilled in the art.

The above are only illustrative specific embodiments of the present invention, and are not intended to limit the scope of the present invention. Any equivalent changes, modifications and combinations made by anyone skilled in the art without departing from the concept and principle of the present invention shall fall within the scope of the present invention.

The invention claimed is:

1. A data acquisition system, comprising:
   data acquisition units constructed to acquire a plurality of data related to a target object at a data acquisition period, wherein one of
   the target object is a driver to drive a robot device, the data acquisition units include sensor units to acquire data related to the driver, and the plurality of data indicates an operating status of the driver of the robot device, or
   the data acquisition units are sensor units in an automated plant, the plurality of data includes parameters of equipment in the automated plant, and the data acquisition units form an Internet of Things (IoT) network; and
   a controller configured to be in communication connection with the data acquisition units, the controller being constructed to set a sampling interval of an ith datum according to an ith data acquisition period of the ith datum used by the data acquisition units to acquire the ith datum among the plurality of data, and to set a polling interval according to a smallest data acquisition period among respective data acquisition periods to be used by the data acquisition units to acquire each respective datum of the plurality of data,
   wherein the controller is configured to perform a first polling on the ith datum upon n_1 polling intervals being elapsed after a start of polling by the controller of the data acquisition units on the plurality of data related to the target object until a formula (3) is first satisfied, the first polling being of a respective data acquisition unit among the data acquisition units used to acquire the ith datum, $$T\_i1 = CP \times n\_1 \geq SP\_i, \qquad \text{formula (3)}$$

and wherein in formula (3), T_i1 is a time elapsed since the start of polling, CP is the polling interval, SP_i is the sampling interval of the ith datum, and n_1 is an integer.

2. The data acquisition system of claim 1, wherein the controller is configured to set the sampling interval of the ith datum according to a formula (1), $$SP\_i = C\_i + C\_i \times (i/M), \qquad \text{formula (1)}$$

and wherein in formula (1), SP_i is the sampling interval of the ith datum, C_i is the ith data acquisition period of the ith datum, the plurality of data include N data groups, each of the N data groups includes M data, i is an ordinal number of the ith datum in a corresponding group of the N data groups, and 0≤i≤M−1.

3. The data acquisition system of claim 1, wherein controller is configured to set the polling interval according to a formula (2), $$CP = (C\_Min \times 10^{len[M \times N]-1})/(M \times N), \qquad \text{formula (2)}$$

and wherein in formula (2), CP is the polling interval, C_Min is the smallest data acquisition period among the respective data acquisition periods of the plurality of data, the plurality of data include N data groups, each of the N data groups includes M data, and len[M×N] is a number of digits of a result of M×N.

4. The data acquisition system of claim 1, wherein the controller is configured to perform a jth polling on the ith datum upon n_j polling intervals being elapsed since the start of polling until a formula (4) is first satisfied, the jth polling being of the respective data acquisition unit among the data acquisition units used to acquire the ith datum, $$T\_ij = CP \times n\_j \geq SP\_i + C\_i \times (j-1), \qquad \text{formula (4)}$$

and wherein in formula (4), T_ij is the time elapsed since the start of polling, CP is the polling interval, SP_i is the sampling interval of the ith datum, C_i is the ith data acquisition period of the ith datum, n_j is an integer, j is an integer, and j≥2.

5. The data acquisition system of claim 1, further comprising:
a connection unit connected between the controller and the data acquisition units, the connection unit to facilitate communication between the controller and the data acquisition units, wherein the connection unit is configured to receive the ith datum from the data acquisition units and send the ith datum to the controller.

6. The data acquisition system of claim 5, wherein the connection unit comprises:
a buffer unit constructed to buffer the ith datum received.

7. The data acquisition system of claim 1, wherein the target object is the driver to drive the robot device, and the data acquisition units include the sensor units to acquire the data related to the driver.

8. The data acquisition system of claim 2, wherein the controller is configured to set the polling interval according to a formula (2), $$CP = (C\_Min \times 10^{len[M \times N]-1})/(M \times N), \qquad \text{formula (2)}$$

and wherein in formula (2), CP is the polling interval, C_Min is the smallest data acquisition period among the respective data acquisition periods of the plurality of data, the plurality of data include N data groups, each of the N data groups includes M data, and len[M×N] is a number of digits of a result of M×N.

9. The data acquisition system of claim 2, further comprising:
a connection unit connected between the controller and the data acquisition units, the connection unit to facilitate communication between the controller and the data acquisition units, wherein the connection unit is configured to receive the ith datum from the data acquisition units and send the ith datum to the controller.

10. The data acquisition system of claim 5, wherein the ith datum is not provided to a sub-controller between being received from the data acquisition units and sent to the controller.

11. The data acquisition system of claim 1, wherein the controller is configured to perform the first polling at the polling interval.

12. The data acquisition system of claim 1, wherein controller is configured to perform the first polling only at the polling interval.

13. The data acquisition system of claim 1, wherein the controller is configured to perform the first polling by:
sending at least one polling instruction to at least one of the data acquisition units; and
receiving at least one datum among the plurality of data from the at least one of the data acquisition units in response to the sending the at least one polling instruction.

14. The data acquisition system of claim 1, wherein the data acquisition units are configured to acquire the plurality of data in real time.

15. A data acquisition method, comprising:
acquiring a plurality of data related to a target object at a data acquisition period, wherein one of
the target object is a driver to drive a robot device, the acquiring is performed using sensor units to acquire data related to the driver, and the plurality of data indicates an operating status of the driver of the robot device, or
the acquiring is performed using sensor units in an automated plant, the plurality of data includes parameters of equipment in the automated plant, and the sensor units in the automated plant form an Internet of Things (IoT) network;
setting a sampling interval of an ith datum according to an ith data acquisition period of the ith datum used to acquire the ith datum among the plurality of data;
setting a polling interval according to a smallest data acquisition period among respective data acquisition periods used to acquire each respective datum of the plurality of data;
performing a first polling on the ith datum upon n_1 polling intervals elapsing since a start of polling on the plurality of data related to the target object until a formula (3) is first satisfied, $$T\_i1 = CP \times n\_1 \geq SP\_i, \quad \text{formula (3)}$$

wherein in formula (3), T_i1 is a time elapsed since the start of polling, CP is the polling interval, SP_i is the sampling interval of the ith datum, and n_1 is an integer; and receiving the ith datum.

16. The data acquisition method of claim 15, wherein the setting the sampling interval sets the sampling interval of the ith datum according to a formula (1), $$SP\_i = C\_i + C\_i \times (i/M), \quad \text{formula (1)}$$

and wherein in formula (1), SP_i is the sampling interval of the ith datum, C_i is the ith data acquisition period of the ith datum, the plurality of data include N data groups, each data group of the N data groups includes M data, i is an ordinal number of the ith datum in a corresponding group of the N data groups, and 0≤i≤M−1.

17. The data acquisition method of claim 15, wherein the setting the polling interval sets the polling interval is set according to a formula (2), $$CP = (C\_Min \times 10^{len[M \times N]-1})/(M \times N), \quad \text{formula (2)}$$

and wherein in formula (2), CP is the polling interval, C_Min is a smallest data acquisition period among the respective data acquisition periods of the plurality of data, the plurality of data include N data groups, each data group of the N data groups includes M data, and len[M×N] is a number of digits of a result of M×N.

18. The data acquisition method of claim 15, further comprising:

performing a jth polling on the ith datum upon n_j polling intervals having elapsed since the start of polling until a formula (4) is first satisfied, $$T\_ij = CP \times n\_j \geq SP\_i + C\_i \times (j-1), \quad \text{formula (4)}$$

wherein in formula (4), T_ij is a time elapsed since the start of polling, CP is the polling interval, SP_i is the sampling interval of the ith datum, C_i is the ith data acquisition period of the ith datum, n_j is an integer, j is an integer, and j≥2.

19. A polling method, comprising:

setting a sampling interval of an ith datum according to an ith data acquisition period of the ith datum used by data acquisition units to acquire the ith datum among a plurality of data of a target object, wherein one of the target object is a driver to drive a robot device, the data acquisition units include sensor units to acquire data related to the driver, and the plurality of data indicates an operating status of the driver of the robot device, or the data acquisition units are sensor units in an automated plant, the plurality of data includes parameters of equipment in the automated plant, and the data acquisition units form an Internet of Things (IoT) network;

setting a polling interval according to a smallest data acquisition period among respective data acquisition periods used by the data acquisition units to acquire each respective datum of the plurality of data; and performing a first polling on the ith datum upon n_1 polling intervals having elapsed since a start of polling on the plurality of data related to the target object until a formula (3) is first satisfied, $$T\_i1 = CP \times n\_1 \geq SP\_i, \quad \text{formula (3)}$$

wherein in formula (3), T_i1 is a time elapsed since the start of polling, CP is the polling interval, SP_i is the sampling interval of the ith datum, and n_1 is an integer.

20. The polling method of claim 19, wherein the setting the sampling interval sets the sampling interval of the ith datum according to a formula (1), $$SP\_i = C\_i + C\_i \times (i/M), \quad \text{formula (1)}$$

and wherein in formula (1), SP_i is the sampling interval of the ith datum, C_i is the ith data acquisition period of the ith datum, the plurality of data include N data groups, each of the N data groups includes M data, i is an ordinal number of the ith datum in a corresponding group of the N data groups, and 0≤i≤M−1.

21. The polling method of claim 19, wherein the setting the polling interval sets the polling interval according to a formula (2), $$CP = (C\_Min \times 10^{len[M \times N]-1})/(M \times N), \quad \text{formula (2)}$$

and wherein in formula (2), CP is the polling interval, C_Min is a smallest data acquisition period among the respective data acquisition periods of the plurality of data, the plurality of data include N data groups, each of the N data groups include M data, and len[M×N] is a number of digits of a result of M×N.

22. The polling method of claim 19, further comprising:

performing a jth polling on the ith datum upon n_j polling intervals having elapsed since the start of polling until a formula (4) is first satisfied, $$T\_ij = CP \times n\_j \geq SP\_i + C\_i \times (j-1), \quad \text{formula (4)}$$

wherein in formula (4), T_ij is the time elapsed since the start of polling, CP is the polling interval, SP_i is the sampling interval of the ith datum, C_i is the ith data acquisition period of the ith datum, n_j is an integer, j is an integer, and j≥2.

23. An electronic device, comprising:

at least one processor;

a memory connected to the at least one processor, the memory storing an instruction which, when executed by the at least one processor, causes the electronic device to perform a data acquisition method, the data acquisition method including acquiring a plurality of data related to a target object at a data acquisition period, wherein one of the target object is a driver to drive a robot device, the acquiring is performed using sensor units to acquire data related to the driver, and the plurality of data indicates an operating status of the driver of the robot device, or the acquiring is performed using sensor units in an automated plant, the plurality of data includes parameters of equipment in the automated plant, and the sensor units in the automated plant form an Internet of Things (IoT) network;

setting a polling interval according to a smallest data acquisition period among respective data acquisition periods used by the data acquisition units to acquire each respective datum of the plurality of data; and performing a first polling on the ith datum upon n_1 polling intervals having elapsed since a start of polling on the plurality of data related to the target object until a formula (3) is first satisfied, $$T\_i1 = CP \times n\_1 \geq SP\_i \qquad \text{formula (3),}$$

wherein in formula (3), $T\_i1$ is a time elapsed since the start of polling, CP is the polling interval, $SP\_i$ is the sampling interval of the ith datum, and $n\_1$ is an integer.

24. A non-transitory machine-readable medium, storing instructions executable by a computer which, upon being executed by at least one processor of the computer, cause the at least one processor to execute the method of claim 15.

25. A non-transitory computer program product, storing instructions executable by a computer which, upon being executed by at least one processor of the computer, cause at least one processor to perform the method of claim 15.

* * * * *